United States Patent
Vajravel et al.

(10) Patent No.: US 12,339,953 B2
(45) Date of Patent: Jun. 24, 2025

(54) ENABLING RUNTIME OBSERVABILITY FOR APPLICATIONS HOSTED IN A SECURE WORKSPACE

(71) Applicant: Dell Products L.P., Round Rock, TX (US)

(72) Inventors: Gokul Thiruchengode Vajravel, Bangalore (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 297 days.

(21) Appl. No.: 18/164,701

(22) Filed: Feb. 6, 2023

(65) Prior Publication Data
US 2024/0265094 A1  Aug. 8, 2024

(51) Int. Cl.
G06F 21/53 (2013.01)
G06F 21/54 (2013.01)

(52) U.S. Cl.
CPC .............. G06F 21/53 (2013.01); G06F 21/54 (2013.01)

(58) Field of Classification Search
CPC .............. G06F 9/53; G06F 9/54; G06F 9/505
See application file for complete search history.

(56) References Cited

U.S. PATENT DOCUMENTS

| | | | |
|---|---|---|---|
| 7,739,689 B1* | 6/2010 | Spertus | G06F 11/0715 717/130 |
| 2006/0143359 A1* | 6/2006 | Dostert | G06F 11/3636 711/6 |
| 2012/0096365 A1* | 4/2012 | Wilkinson | G06F 9/468 715/740 |
| 2017/0214737 A1* | 7/2017 | Agarwal | G06F 9/505 |
| 2020/0126017 A1* | 4/2020 | Damonte | G06F 8/20 |
| 2021/0263780 A1* | 8/2021 | Ou | G06F 9/5077 |
| 2022/0147381 A1* | 5/2022 | Gao | G06F 9/45558 |
| 2022/0197716 A1* | 6/2022 | Vijayvargiya | G06F 9/5088 |
| 2022/0214912 A1* | 7/2022 | Julien | G06F 9/4856 |
| 2022/0284890 A1* | 9/2022 | Contractor | G10L 15/08 |

* cited by examiner

Primary Examiner — Dao Q Ho
(74) Attorney, Agent, or Firm — Kirton McConkie; Brian Tucker

(57) ABSTRACT

Runtime observability can be enabled for applications hosted in a secure workspace. An observability service can be included in a secure workspace deployed on a user computing device and can be selectively enabled at runtime to observe one or more applications hosted in the secure workspace. The observability service can gather information about any application it observes and provide the information to a workspace agent that is also executed in the secure workspace. The workspace agent can then relay the information to a host agent that runs on the user computing device which in turn can relay the information to a management service hosted on a management server. An administrator can then use an observability solution to analyze the information.

14 Claims, 6 Drawing Sheets

ENABLING RUNTIME OBSERVABILITY FOR APPLICATIONS HOSTED IN A SECURE WORKSPACE

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or software-based container. An application hosted in a secure workspace will be isolated from resources in the external environment and from other applications or services hosted external to the secure workspace, including native applications.

Due to the isolation of the secure workspace, an application hosted in a secure workspace cannot easily be observed such as for debugging, tuning, or optimization. For example, to observe an application hosted in a secure workspace, it would be necessary to deploy an entire observability solution, such as xPerf, Windows Performance Toolkit, or Dr. Watson, in the secure workspace. However, this may not be feasible in many cases due to the size of the observability solution. Also, different observability solutions may be required for different secure workspaces on the same computing device (e.g., one for a Windows-based secure workspace and another for a Linux-based secure workspace). Further, an observability solution cannot be deployed in a secure workspace at runtime because it would be necessary to reboot.

Some observability options have been developed for secure workspaces, but such options require that audit and debug privileges be granted to the user account. In other words, the user of the user computing device on which the secure workspace is deployed would need to have admin-level privileges. In addition to being undesirable for most scenarios, antivirus solutions oftentimes block the observability functionality implemented in this way.

Some observability solutions exist for observing secure workspace performance on the user computing device. However, such solutions run in the host operating system environment and can only observe the workspace daemon/host rather than any applications running inside of any secure workspace that the workspace daemon/host may create.

For these and other reasons, an administrator will typically forego observing the performance of an application hosted in a secure workspace. As a result, the user experience may be degraded as performance issues go unresolved.

BRIEF SUMMARY

The present invention extends to systems, methods and computer program products for enabling runtime observability for applications hosted in a secure workspace. An observability service can be included in a secure workspace deployed on a user computing device and can be selectively enabled at runtime to observe one or more applications hosted in the secure workspace. The observability service can gather information about any application it observes and provide the information to a workspace agent that is also executed in the secure workspace. The workspace agent can then relay the information to a host agent that runs on the user computing device which in turn can relay the information to a management service hosted on a management server. An administrator can then use an observability solution to analyze the information.

In some embodiments, the present invention may be implemented as a method for enabling runtime observability for applications hosted in a secure workspace. A workspace agent that is executing in a first secure workspace on a user computing device can determine that a first application hosted in the first secure workspace is to be observed. The first secure workspace can be configured to cause an observability service to commence observing the first application. The observability service can gather information about the first application and provide the information about the first application to the workspace agent for delivery to a host agent executing on the user computing device outside the first secure workspace.

In some embodiments, the present invention may be implemented as computer storage media storing computer executable instructions which when executed implement a method for enabling runtime observability for applications hosted in a secure workspace. A management service can send a request to a host agent executing on a user computing device to observe one or more applications that are hosted in a secure workspace on the user computing device. The host agent can send the request to a workspace agent executing in the secure workspace. The workspace agent can configure the secure workspace to cause an observability service to commence observing the one or more applications. The observability service can send information gathered from observing the one or more applications to the workspace agent. The workspace agent can then send the information to the host agent for delivery to the management service.

In some embodiments, the present invention may be implemented as a system that includes a management service hosted on a management server and one or more user computing devices that are managed from the management server. Each of the one or more computing devices may include a host agent and one or more secure workspaces. Each secure workspace can include a workspace agent that is configured to enable runtime observability of one or more applications hosted in the workspace using an observability service. The workspace agent can also be configured to route information gathered by the observability service about the one or more applications to the host agent for delivery to the management service.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
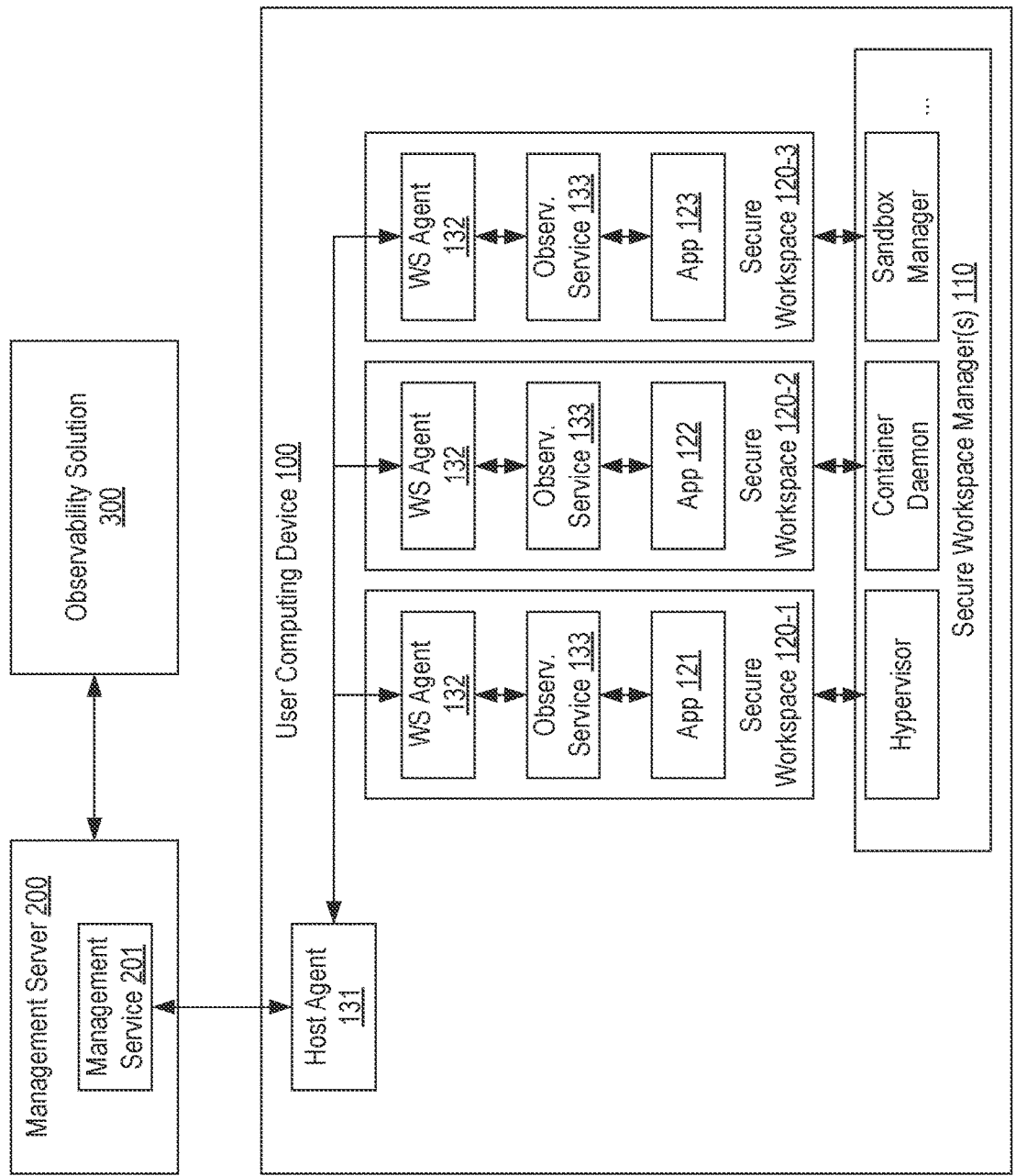
FIG. 1 provides an example of a computing environment in which embodiments of the present invention may be implemented.

FIG. 1 provides an example of a computing environment in which one or more embodiments of the present invention may be implemented. This computing environment includes a user computing device 100, a management server 200 which is used to manage user computing device 100, and an observability solution 300. Although only a single user computing device 100 is shown, management server 200 may typically be used to manage a large number of user computing devices, any or all of which could be configured in the same manner as user computing device 100 to thereby allow runtime observability to be enabled for applications hosted in secure workspaces in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, etc. In the depicted example, it is assumed that three workspaces are deployed on user computing device: secure workspace 120-1 in the form of a virtual machine; secure workspace 120-2 in the form of a container; and secure workspace 120-3 in the form of a sandbox. However, there could be any number and/or type of secure workspaces at any given time.

In accordance with embodiments of the present invention, a secure workspace can be configured to include a workspace (WS) agent 132 and an observability service 133 to enable runtime observability for one or more applications hosted in the secure workspace such as app 121 in secure workspace 120-1, app 122 in secure workspace 120-2, and app 123 in secure workspace 120-3. User computing device 100 can also include a host agent 131 which can be configured to communicate with each instance of workspace agent 132 as part of enabling the runtime observability. An administrator can use a management service 201 on management server 200 to interface with host agent 131 to coordinate the runtime observability. The administrator may also leverage an observability solution 300 to process information obtained from the runtime observation of an application in a secure workspace.

Observability service 133 can be a small footprint component that is configured to register within the respective secure workspace to be notified of an exception in the execution of one or more applications hosted in the respective secure workspace. For example, observability service 133 in secure workspace 120-1 can register to be notified when an exception occurs during the execution of app 121. In some embodiments, observability service 133 may be registered for such notifications using image file execution options (or similar functionality). For example, an image for a secure workspace can be configured to cause observability service 133 to be invoked whenever an app to be observed is executed in the secure workspace. In such cases, the application may execute within the context of observability service 133 thus allowing observability service 133 to collect information about the application as it executes. As another example, an image for a secure workspace can be configured to cause observability service 133 to be invoked whenever an app to be observed silently exits. In such cases, observability solution 133 may collect information about the application relating to its silent exit.

Notably, configuring observability service 133 in this manner allows observability to be enabled at runtime. For example, an administrator may use management service 201 to send an instruction to host agent 131 requesting that observability of app 121 be enabled. Host agent 131 could then modify the image for secure workspace 120-1 to cause observability service 133 to be registered to handle exceptions in the execution of app 121. Alternatively, if secure workspace 120-1 is already deployed, host agent 131 could notify workspace agent 132 that app 121 should be observed and workspace agent 132 could then register observability 133 to handle app 121's exceptions (e.g., by setting appropriate registry values and starting/restarting app 121).

Observability service 133 can be configured to report information that it collects to workspace agent 132. Workspace agent 132 can then relay the information to host agent 131 which in turn can send the information to management service 201. Management service 201 may then leverage observability solution 300 to analyze the information and/or to identify remediations or improvements to be made. In this way, embodiments of the present invention allow observability solution 300 to be used to observe applications hosted in different types of secure workspaces at runtime using the small footprint observability service 133.

Figure 2A:
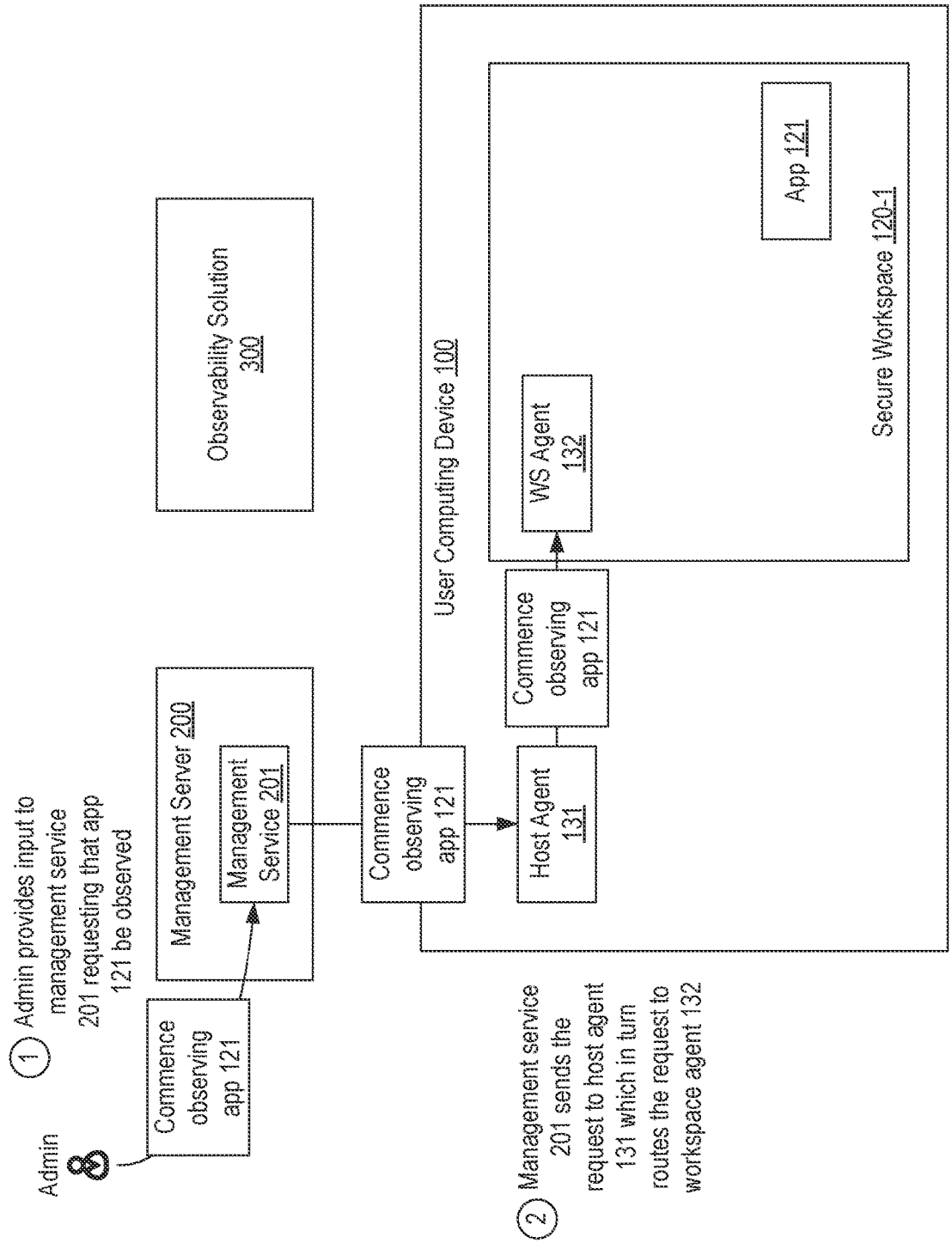
FIGS. 2A-2D provide an example of how runtime observability can be enabled for applications hosted in a secure workspace in accordance with one or more embodiments of the present invention.

FIGS. 2A-2D provide an example of how runtime observability can be enabled for an application hosted in a secure workspace in accordance with one or more embodiments of the present invention. In this example, and as represented in FIG. 2A, it is assumed that secure workspace 120-1 is deployed on user computing device 100 and that app 121 is executing within secure workspace 120-1. It is also assumed that an administrator desires to observe app 121 so that it may be analyzed using observability solution 300. For example, the administrator may be aware of performance issues that app 121 is experiencing and may want to diagnose the performance issues and identify a remediation.

In step 1, the administrator can provide input to management service 201 requesting that app 121 be observed. This input could specifically identify only app 121 or could identify any app that may be hosted in secure workspace 120-1. In step 2, management service 201 can send the request to host agent 131 executing on user computing device 100 which in turn can route the request to workspace agent 131 that is executed within secure workspace 120-1.

Figure 2B:
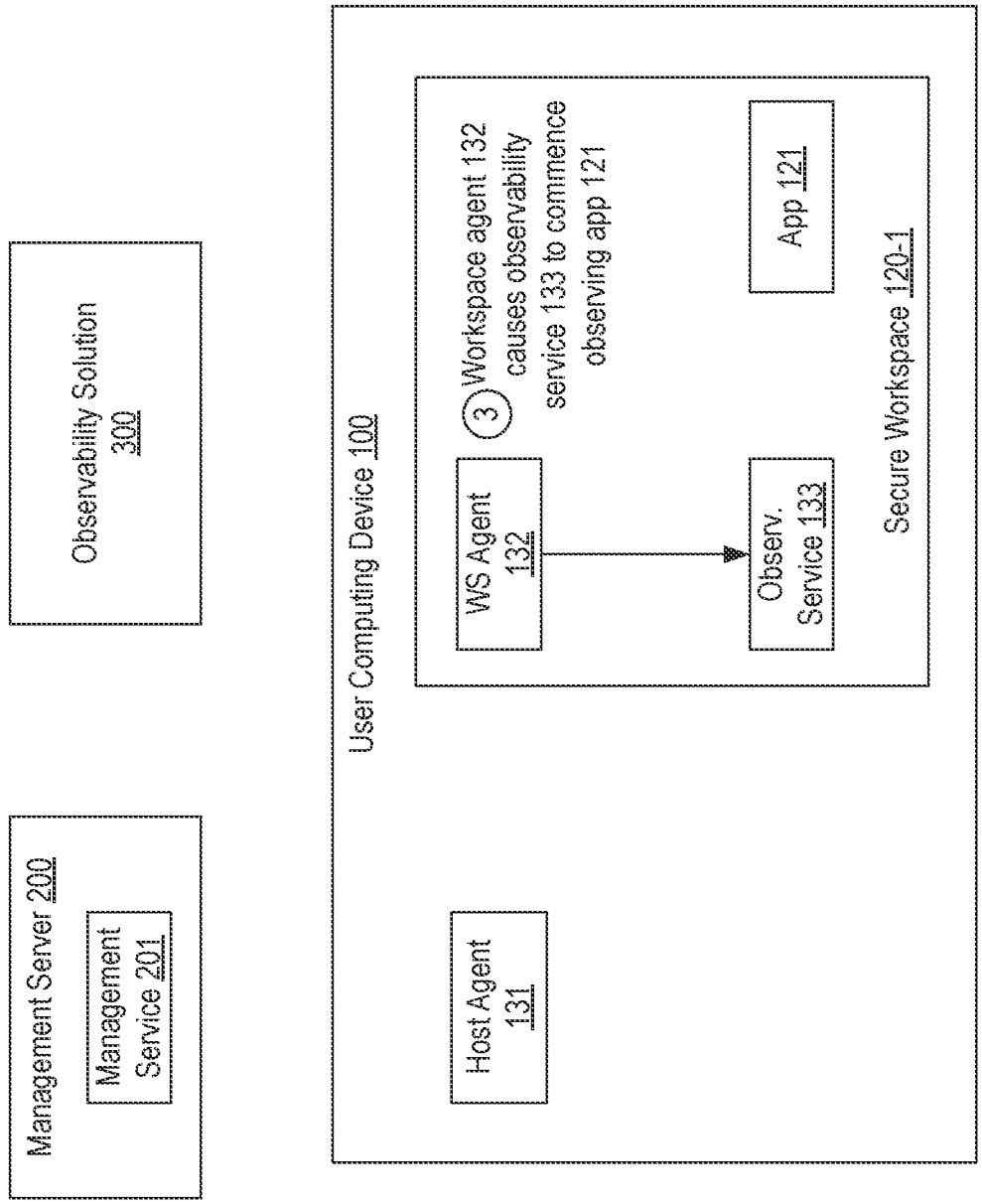

Turning to FIG. 2B, in step 3, workspace agent 132 can cause observability agent 133 to commence observing app 121. In some embodiments, step 3 may entail configuring secure workspace 120-1 to cause app 121 to be run in the context of observability service 133. In such cases, workspace agent 132 could accomplish this by modifying registry entries, global flags, etc. to cause observability service 133 to be launched when app 121 is invoked. In some embodiments, workspace agent 132 could be configured to stop app 121 and then restart app 121 after making such modifications so that app 121 is restarted in the context of observability service 133. In other embodiments, however, observability service 133 could be configured to commence observing app 121 without stopping app 121.

In some embodiments, step 3 could entail registering observability service 133 to be invoked when app 121 generates an exception. For example, workspace agent 132 could configure secure workspace 120-1 so that observability service 133 will be invoked when app 121 silently exists (e.g., when it kills its process or has its process killed), performs an access violation, or otherwise performs functionality that causes an exception handler to be invoked.

Alternatively, in some embodiments, such as when secure workspace 120-1 may not be deployed when the request to observe app 121 is received, host agent 131 could directly modify an image of secure workspace 120-1 in response to the request to cause observability service 133 to observe app 121 once secure workspace 120-1 is deployed. For example, host agent 131 could modify the image of secure workspace 120-1 to contain registry entries, global flags, etc. to accomplish the above-described functionality.

Figure 2C:
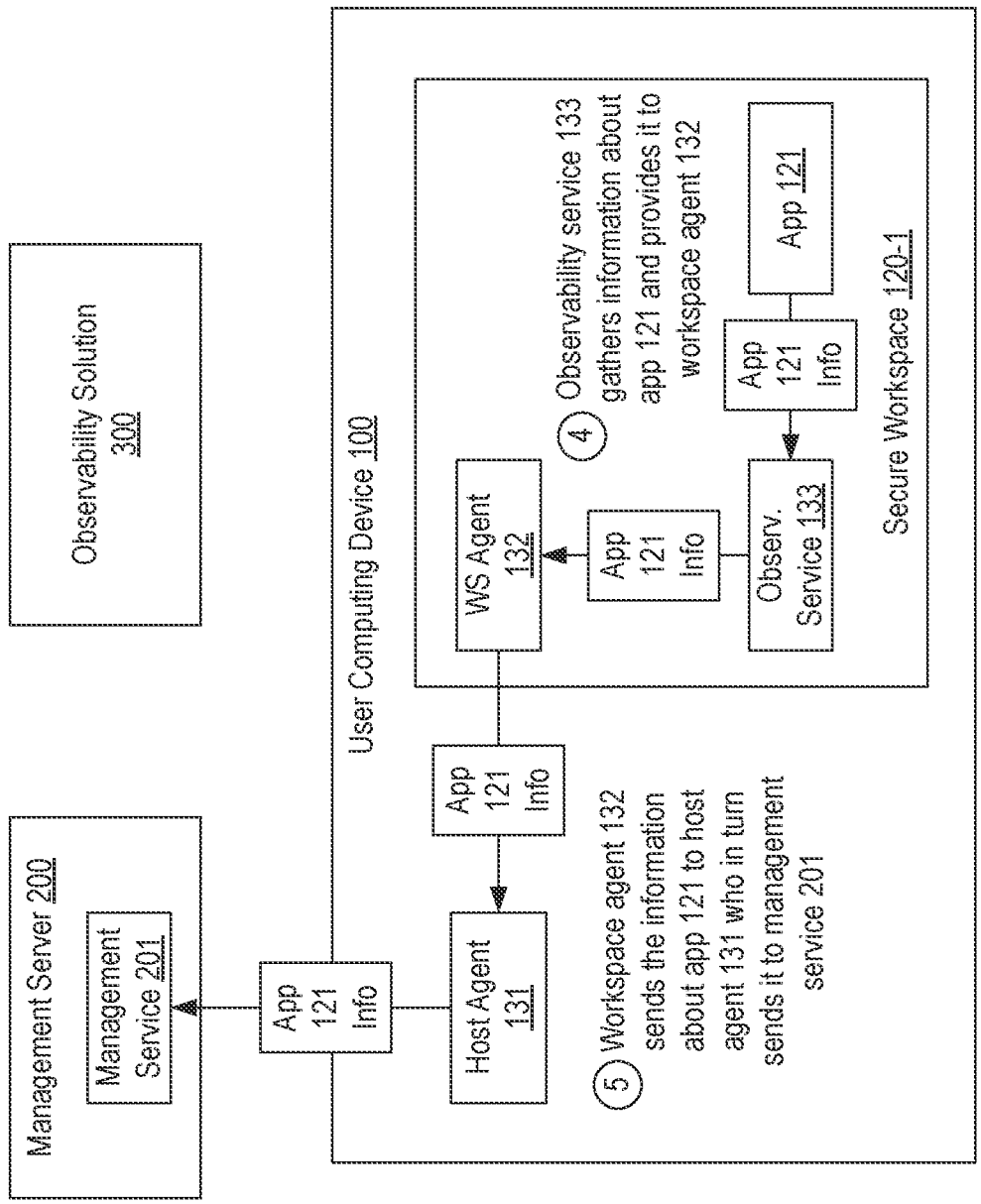

Turning to FIG. 2C, in step 4, observability service 133 can gather information about app 121 as it observes app 121. For example, this information could include an identification of an exception that app 121 generated, an identification of an event handler that app 121 invoked, a process ID of app 121, a memory dump of app 121's memory heap, or any other information that may be analyzed using observability solution 300. As suggested above, observability service 133 could gather this information while app 121 executes, when app 121 is killed, when app 121 generates an exception, etc. Also as part of step 4, observability service 133 can provide the gathered information to workspace agent 132.

In step 5, workspace agent 132 can send the information about app 121 to host agent 132 which in turn can send it to management service 201. In some embodiments, management service 201 could maintain a database in which it stores information gathered by observability service 133. Notably, in some embodiments, steps 4 and 5 could be performed in conjunction with multiple secure workspaces on user computing device 100. For example, instances of observability service 133 running in secure workspaces 120-1, 120-2, and 120-3 could gather information about apps 121, 122, and 123 respectively and could provide such information to host agent 131 via respective instances of workspace agent 132 even though these secure workspaces could be different types of secure workspaces. In other words, host agent 131 could collect and relay information about apps running in secure workspaces regardless of the type of workspaces in which they are run.

Figure 2D:
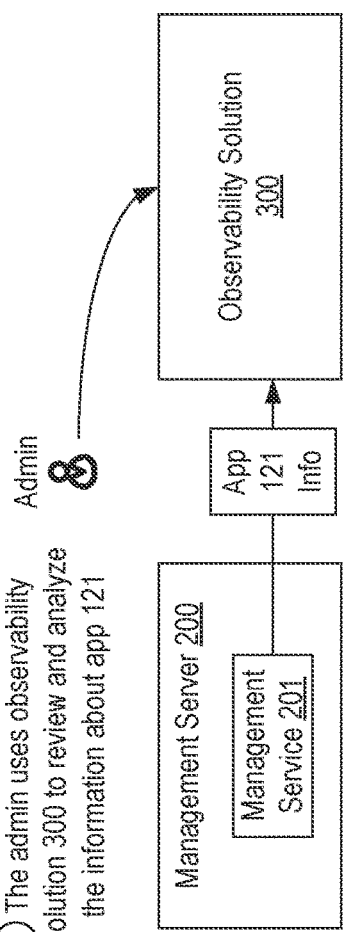
Figure 2D:
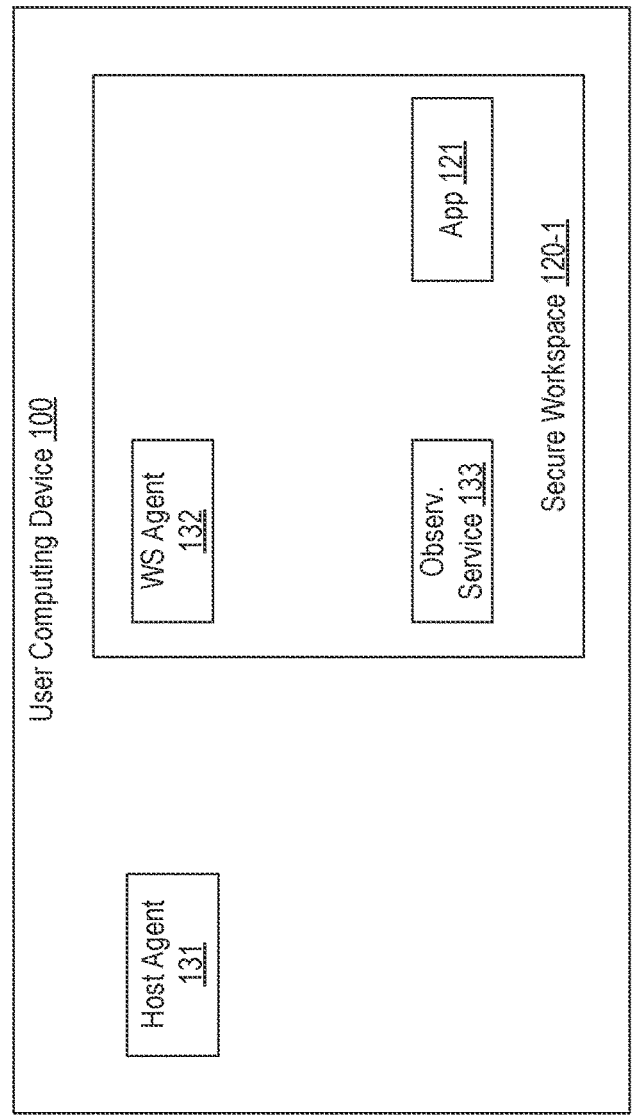

Turning to FIG. 2D, in step 6 and with the information about app 121 being stored on or accessible to management service 201, the administrator can use observability service 300 to review and analyze the information. Accordingly, the administrator can use observability solution 300 to observe app 121 as if app 121 were installed locally on user computing device 100 rather than being isolated within secure workspace 120-1.

Figure 3:
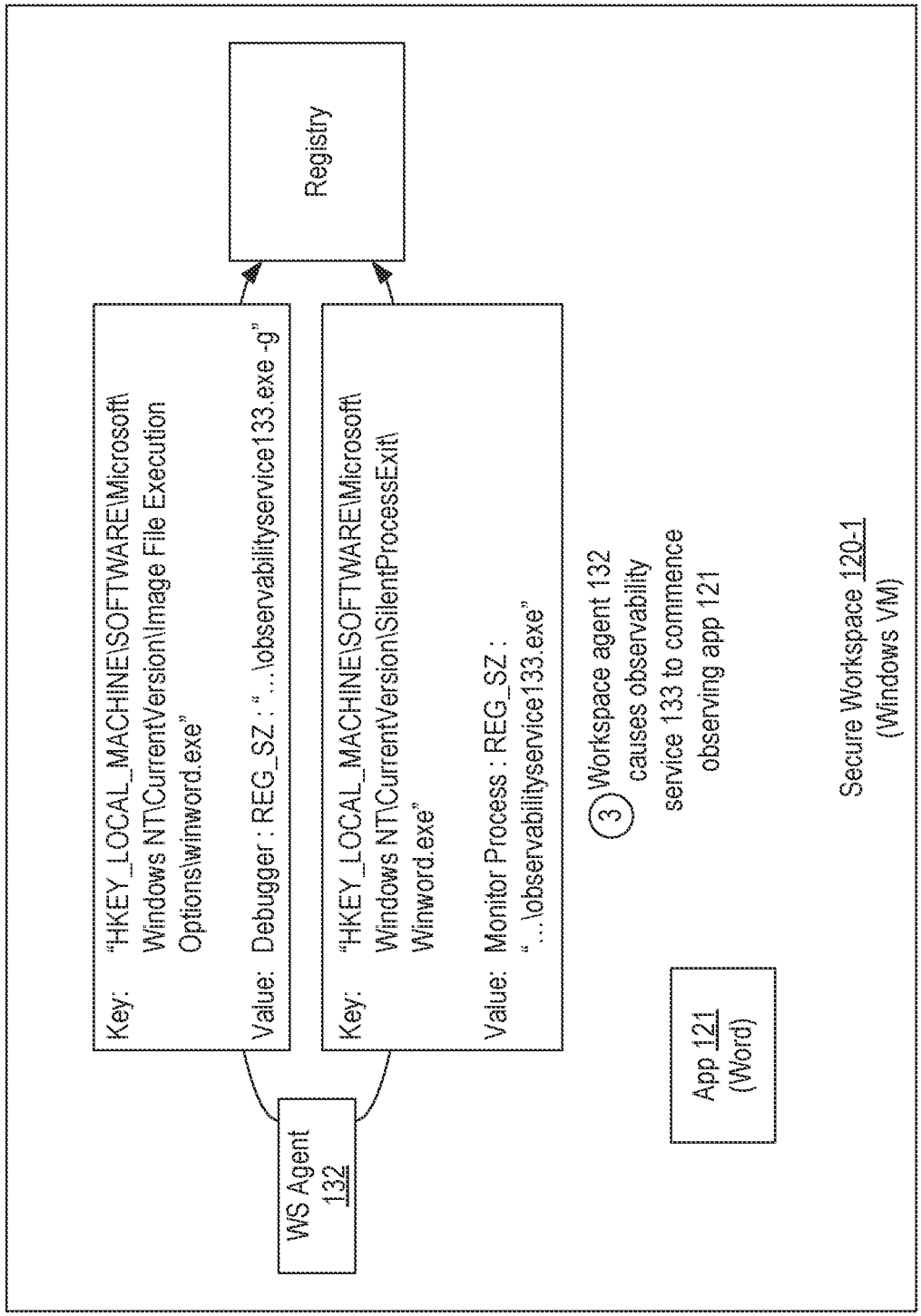
FIG. 3 provides another example of how runtime observability can be enabled for applications hosted in a secure workspace in accordance with one or more embodiments of the present invention.

FIG. 3 provides additional examples of how step 3 may be performed when app 121 is Microsoft Word and secure workspace 120-1 is a Windows-based virtual machine. As shown, workspace agent 132 could cause observability service 133 to commence observing Microsoft Word by creating key/value pairs in the registry. Workspace agent 132 could add these key/value pairs at runtime without requiring secure workspace 120-1 or user computing device 100 to be rebooted. Likewise, workspace agent 132 could remove these key/value pairs at runtime when it is no longer desired that observability service 133 observes Microsoft Word.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling runtime observability for applications hosted in a secure workspace, the method comprising:

determining, by a management service, that a first application hosted in a first secure workspace on a first user computing device is to be observed;

based on the determination. sending. by the management service, a first request to a host agent executing on the first user computing device outside of the first secure workspace. the first request instructing the host agent to cause the first application to be observed within the first secure workspace;

in response to receiving the first request. sending, by the host agent. a second request to a workspace agent executing inside the first secure workspace, the second request instructing the workspace agent to cause the first application to be observed within the first secure workspace;

configuring, by the workspace agent, the first secure workspace to cause an observability service to commence observing the first application by registering the observability service to be invoked when the first application causes an exception handler to be invoked within the first secure workspace;

in response to the first application causing the exception handler to be invoked. gathering, by the observability service, information about the first application, the information including an identifier of the first application and an identification of an exception that caused the exception handler to be invoked;

providing, by the observability service, the information about the first application to the workspace agent;

delivering, by the workspace agent, the information to the host agent; and relaying, by the host agent. the information to the management service. wherein the management service stores the information and provides the information to an administrator for analysis.

2. The method of claim 1, wherein the administrator generates the first request.

3. The method of claim 1, wherein registering the observability service to be invoked when the first application causes the exception handler to be invoked within the first secure workspace comprises registering the observability service to be invoked when the first application silently exits.

4. The method of claim 1, wherein registering the observability service to be invoked when the first application causes an exception handler to be invoked within the first secure workspace comprises creating one or more key/value pairs in a registry of the first secure workspace.

5. The method of claim 1, further comprising:
sending, by the host agent, the information about the first application to a management service.

6. The method of claim 1, further comprising:
gathering, by the observability service, information about a second application that is hosted in the first secure workspace; and
providing the information about the second application to the workspace agent for delivery to the host agent.

7. The method of claim 1, further comprising:
determining, by a second workspace agent that is executing in a second secure workspace on the user computing device, that a second application hosted in the second secure workspace is to be observed;
configuring the second secure workspace to cause a second observability service to commence observing the second application;
gathering, by the second observability service, information about the second application; and
providing the information about the second application to the second workspace agent for delivery to the host agent.

8. The method of claim 7, wherein the first secure workspace and the second secure workspace are different types of secure workspaces.

9. One or more computer storage media storing computer executable instructions which when executed implement a method for enabling runtime observability for applications hosted in a secure workspace, the method comprising:
determining, by a management service. that a first application hosted in a first secure workspace on a first user computing device is to be observed;
based on the determination. sending. by the management service. a first request to a host agent executing on the first user computing device outside of the first secure workspace, the first request instructing the host agent to cause the first application to be observed within the first secure workspace;

in response to receiving the first request. sending, by the host agent. a second request to a workspace agent executing inside the first secure workspace, the second request instructing the workspace agent to cause the first application to be observed within the first secure workspace;

configuring, by the workspace agent, the first secure workspace to cause an observability service to commence observing the first application by registering the observability service to be invoked when the first application causes an exception handler to be invoked within the first secure workspace;

in response to the first application causing the exception handler to be invoked. gathering. by the observability service, information about the first application. the information including an identifier of the first application and an identification of an exception that caused the exception handler to be invoked;

providing. by the observability service. the information about the first application to the workspace agent:

delivering, by the workspace agent, the information to the host agent; and relaying, by the host agent, the information to the management service. wherein the management service stores the information and provides the information to an administrator for analysis.

10. The computer storage media of claim 9, wherein registering the observability service to be invoked when the first application causes an exception handler to be invoked within the first secure workspace comprises creating one or more key/value pairs in a registry of the first secure workspace.

11. The computer storage media of claim 9, wherein registering the observability service to be invoked when the first application causes the exception handler to be invoked within the first secure workspace comprises registering the observability service to be invoked when the one or more applications silently exit.

12. A system comprising:
a management service hosted on a management server; and
user computing devices that are managed from the management server, each of the user computing devices including a host agent and one or more secure workspaces, each secure workspace including a workspace agent that is configured to enable runtime observability of one or more applications hosted in the workspace using an observability service and to route information gathered by the observability service about the one or more applications to the host agent for delivery to the management service, wherein each user computing device is configured to perform the following:

receive, by the host agent and from the management service. a first request that instructs the host agent to cause a first application of the one or more applications to be observed within a first secure workspace of the one or more secure workspaces;

in response to receiving the first request, sending, by the host agent, a second request to the workspace agent executing inside the first secure workspace, the second request instructing the workspace agent to cause the first application to be observed within the first secure workspace;

configuring, by the workspace agent, the first secure workspace to cause the observability service to commence observing the first application by registering the observability service to be invoked when the first application causes an exception handler to be invoked within the first secure workspace;

in response to the first application causing the exception handler to be invoked. gathering, by the observability service, information about the first application, the information including an identifier of the first application and an identification of an exception that caused the exception handler to be invoked;

providing, by the observability service, the information about the first application to the workspace agent;

delivering, by the workspace agent. the information to the host agent; and relaying, by the host agent, the information to the management service, wherein the management service stores the information and provides the information to an administrator for analysis.

13. The system of claim 12, wherein registering the observability service to be invoked when the first application causes the exception handler to be invoked within the first secure workspace comprises registering the observability service to be invoked when the first application silently exits.

14. The system of claim 12, wherein registering the observability service to be invoked when the first application causes an exception handler to be invoked within the first secure workspace comprises creating one or more key/value pairs in a registry of the first secure workspace.

* * * * *